UNITED STATES PATENT OFFICE 2,272,163

METHINE DYESTUFFS

John David Kendall, Ilford, England, assignor to Ilford Limited, Ilford, England, a British company No Drawing. Application November 13, 1937, Serial No. 174,489. In Great Britain November 14, 1936

12 Claims. (Cl. 260—240)

This invention relates to the production of dyestuffs.

British Patent Specification No. 426,718 describes a process for preparing dyestuffs in which a heterocyclic compound containing the grouping:

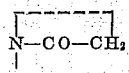

or a tautomeric form thereof, for example, a rhodanic acid:

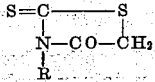

(R=hydrogen, or an alkyl, aryl or aralkyl group)

is condensed with a quaternary salt of a heterocyclic nitrogen compound having a reactive alkylthiol group in the α or γ position to the nitrogen atom.

British Patent Specification No. 428,359 describes the preparation of dyestuffs by condensing compounds of the type described above with a quaternary salt of a heterocyclic nitrogen compound containing an anilido or acetanilido grouping in the α or γ position to the nitrogen atom or by reacting the compound with a diphenyl formamidine or the like and condensing the resulting compound with a quaternary salt of a heterocyclic compound having a reactive methyl group in the α or γ position to the nitrogen.

In both these cases the reaction is believed to take place with the cyclic methylene group.

It has now been found that rhodanic acid and similar 5-membered ring compounds can be employed to form a still further series of dyestuffs.

The present invention comprises a method of preparing dyestuffs by condensing a 5-membered ring compound containing the system:

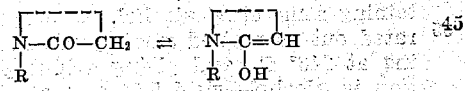

in the presence of an anhydride of a monobasic organic acid and an acid binding agent with a quaternary salt of a heterocyclic nitrogen compound having a reactive methyl group in the α or γ position to the nitrogen atom.

Using the condensation of N-methyl-rhodanic acid and methyl-benzthiazole ethiodide as an example, the reaction is believed to take the following course:

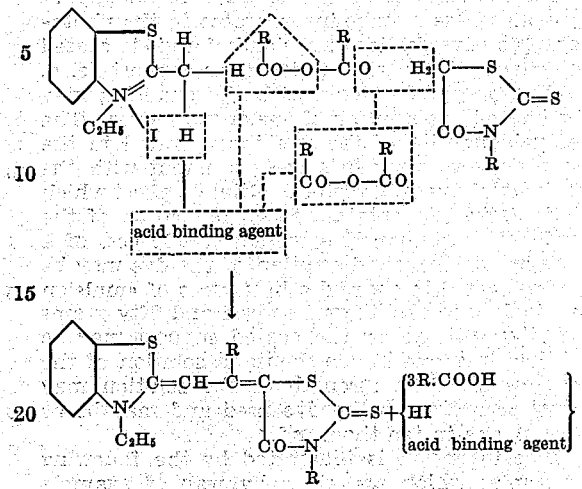

The reaction must be carried out in solution and either the acid binding agent or the anhydride of a monobasic organic acid or the mixture of both may act as the solvent.

The anhydride of a monobasic organic acid in addition to entering into the condensation reaction also serves as a dehydrating agent.

Anhydrides of both monobasic aliphatic and aromatic carboxylic acids may be employed, for example acetic anhydride, propionic anhydride and benzoic anhydride. Examples of acid binding agents which may be employed are pyridine and other tertiary nitrogen bases for example trialkylamines and dimethylaniline also alkali metal salts of organic acids for example sodium acetate.

The compounds containing the system:

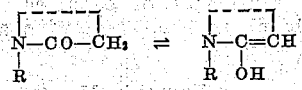

may be any of those referred to in British patent specification No. 426,718, for example, rhodanic acid, 4-keto-2-seleno-tetrahydro thiazole (prepared as described in Austrian patent specification No. 145,203) oxindoles, true hydantoins and thiohydantoins, ψ-hydantoins and ψ-thiohydantoins, 2:4-diketotetrahydrothiazoles, pyrazolones, 2:4-diketotetrahydroselenazoles, 4-keto-2-thio (or seleno) tetrahydro-oxazoles, 4-keto-2-thio (or seleno) tetrahydro-selenazoles and their N-alkyl, N-aryl or N-aralkyl substitution compounds.

The methyl substituted heterocyclic nitrogen compounds which may be condensed with these compounds may be any of the azoles, azines, diazoles and diazines customarily employed in the production of cyanine and related dyes, for example, thiazoles, oxazoles, selenazoles and their polycyclic homologues such as those of the benzene naphthalene, acenaphthene and anthracene series; pyridine and its polycyclic homologues such as quinoline and naphthaquinoline; lepidines; indilenines; pyrimidines and quinazoline; thio-$\beta\beta'$-diazole; oxazolines, thiazolines and selenazolines. The polycyclic compounds of these series may also be substituted in the carbocyclic rings with one or more groups such as hydroxy, alkoxy, methylene and dioxy groups.

The dyestuffs produced in accordance with the present invention are sensitisers for photographic silver halide emulsions and the invention also includes photographic silver halide emulsions sensitised with the dyestuffs. For sensitising purposes the dye may be incorporated in the photographic silver halide emulsion before it is coated on a support, or alternatively the support (e. g. a film or plate) coated with the emulsion may be bathed in a solution of one or more dyes. The actual quantity of the dye incorporated in the emulsion will vary to a certain extent with the individual dye, and with the ultimate effect which it is desired to obtain. As an indication of the order of the quantities employed, 100 ccs. of a one in one thousand solution of the dye may be incorporated in six and a half litres of emulsion equivalent to about two hundred and fifty grams of silver nitrate, or the coated support may be bathed in a one in one thousand solution of the compound. The strength of the solution may vary according to the dye used and may be as low as one in ten thousand.

The invention is illustrated by the following examples which are given by way of example only:

Example I 7.5 grams of 1-methyl-benzthiazole and 9.4 grams of methyl-p-toluene sulphonate were fused together for 2½ hours at 140–150° C. The mixture was then cooled and 8.0 grams of N-ethyl-rhodanic acid were added together with 45 ccs. of pyridine and 8 ccs. of acetic anhydride. The mixture was gently warmed for about 15 minutes to effect solution and then boiled for about 25 minutes under a reflux condenser after which it was poured into 20 ccs. of alcohol. A dyestuff settled out which was separated off, collected and washed with alcohol leaving crystals melting at 234° C. which dissolved in alcohol to give a pink solution. This dyestuff is a sensitiser for silver halide photographic emulsions and extends the sensitivity of a silver iodobromide emulsion to about $\lambda$ 6300 Å. with a maximum at about $\lambda$ 5600 Å.

Example II 1.35 grams of 1-methyl-benzoxazole and 2.1 grams of ethyl-p-toluene sulphonate were fused together at 140–150° C. for 3½ hours. The mixture was then allowed to cool and 1.47 grams of N-methyl-rhodanic acid were added together with 20 ccs. of pyridine and 5 ccs. of acetic anhydride. The mixture was then gently heated for about five minutes to effect solution and was then boiled gently under a reflux condenser for a further 20 minutes. The resulting mixture was then poured into 100 ccs. of water. An oily layer settled out and was separated off from the aqueous layer and treated with methyl alcohol and acetone. A solid dyestuff separated out which was collected, and washed with alcohol and ether and then recrystallised from methyl alcohol as crystals which melted at 230° C. and which dissolved in alcohol to give an orange solution.

The dyestuff is a sensitiser and extends the sensitivity of silver iodobromide emulsion fairly uniformly to about $\lambda$ 5500 Å. tailing off to about $\lambda$ 6000 Å.

Example III 2.75 grams of 1-methylbenzoxazole methyl iodide, 1.47 grams of N-methyl-rhodanic acid, 20 ccs. of pyridine and 5 ccs. of acetic anhydride were mixed and gently boiled together under a reflux condenser for about 20 minutes. The mixture was then poured into 100 ccs. of water and an oily layer separated out; 200 ccs. of acetone were then added when most of the oily layer dissolved up leaving a solid residue. This residue was filtered off and washed and recrystallised to yield crystals which melted at 275° C., and which dissolved in alcohol to give an orange solution.

The dyestuff is a sensitiser for silver iodobromide emulsions and produces a maximum sensitivity at about $\lambda$ 5500 Å.

Example IV 13.2 grams of 1-methyl-benthiazole and 16.5 grams of methyl-p-toluene sulphonate were fused together for 2½ hours at 130–140° C. 13.0 grams of N-methyl-rhodanic acid, 90 ccs. of pyridine and 15 ccs. of acetic anhydride were then added and the mixture was first warmed gently for about 15 minutes to effect solution, after which it was gently boiled for a further 25 minutes under a reflux condenser. The mixture was then poured into 30 ccs. of alcohol when a dye was precipitated. This dye was filtered off, washed and recrystallised as crystals which melted at 296° C., and which dissolved in alcohol to give a pink solution.

The dyestuff is a sensitiser and extends the sensitivity of a silver iodobromide emulsion to about $\lambda$ 6800 Å. with a maximum at about $\lambda$ 5750 Å.

Example V 14.3 grams of quinaldine were fused together with 18.6 grams of methyl-p-toluene sulphonate at 130–140° C. for about three hours. The mixture was allowed to cool and 14.7 grams of N-methyl-rhodanic acid, 120 ccs. of pyridine and 30 ccs. of acetic anhydride were added. The mixture was then gently boiled under a reflux condenser for a further 1½ hours. It was then allowed to cool and poured into a beaker containing some ethyl alcohol. The dyestuff separated out as matted small green needles, melting at 246° C., and giving a blue purple solution in alcohol—yield 5.54 grams. After filtering off the dye precipitated in the spirit solution a further quantity of dye was obtained by diluting the filtrate with water.

The dyestuff is a sensitizer for photographic silver halide emulsion and extends the sensitivity of silver iodobromide emulsion to $\lambda$ 6400 Å. with maxima at about $\lambda$ 5,800 Å. and $\lambda$ 4,800 Å.

Example VI 7.1 grams of lepidine were fused with 9.3 grams of methyl-p-toluene sulphonate for 2½ hours at 130–140° C. The mixture was then allowed to cool and 7.3 grams of N-methyl-rhodanic acid, 60 ccs. of pyridine and 15 ccs. of acetic anhydride were added. The mixture was then gently boiled under a reflux condenser for 1½ hours, after which the mixture was poured into a beaker containing alcohol. Since no precipitate formed water was added to the alcohol, and a precipitate was obtained, melting at 140–160° C. This was filtered off and discarded, on further dilution of the filtrate 2.01 grams of a solid melting at 192° C. were obtained.

Example VII 30.1 grams of 2:3:3 trimethylindolenine methiodide were mixed with 14.7 grams of N-methyl-rhodanic acid, 90 ccs. of pyridine and 30 ccs. of acetic anhydride and the mixture was gently boiled under a reflux condenser for about 1½ hours. The mixture was then allowed to cool and poured into a beaker of alcohol, water was then added and an oily substance precipitated out. This substance was separated from the aqueous alcohol layer, and warmed with alcohol whereuopn the oil dissolved and, on cooling, the dyestuff was obtained as 6.7 grams of red-purple matted crystals, melting at 179° C. and giving an orange solution in alcohol.

The dyestuff is a sensitizer for silver halide photographic emulsions and extends the sensitivity of silver iodobromide emulsion to about $\lambda$ 6400 Å. with maxima at about $\lambda$ 5800 Å. and $\lambda$ 4700 Å.

Example VIII 3.0 grams of 1-methylbenzthiazole and 3.82 grams of methyl-p-toluene sulphonate were fused together for 2 hours at 130–140° C. The mixture was then allowed to cool and 2.6 grams of rhodanic acid, 25 ccs. of pyridine and 6 ccs. of acetic anhydride were added, after which the mixture was gently boiled under a reflux condenser for 1½ hours. The mixture was allowed to cool and poured into a beaker containing alcohol when crystals of the dyestuff separated out. These crystals were filtered off, washed with alcohol and boiled out with 100 ccs. of methyl alcohol, leaving 0.59 grams of dark grey crystals melting at 279° C., and giving a rose coloured solution in alcohol.

The dyestuff is a sensitizer for photographic silver halide emulsions and extends the sensitivity of a silver iodobromide emulsion to about $\lambda$ 5800 Å. with maxima at about $\lambda$ 5700 Å. and $\lambda$ 4700 Å.

Example IX 1.54 grams of 1-methylbenzthiazole, 2.2 grams of ethyl-p-toluene sulphonate were fused together for 3½ hours at 140–150° C. The mixture was then allowed to cool and 1.47 grams of N-methyl rhodanic acid, 20 ccs. of pyridine and 5 ccs. of acetic anhydride were added. The mixture was then gently warmed for 5 minutes and then boiled under a reflux condenser for about 20 minutes, and poured into a solution of 4 grams of potassium bromide in 100 ccs. of water. An oily substance precipitated out, which was separated off from the aqueous layer, dissolved in methyl alcohol with heating, and reprecipitated by the addition of acetone. The dyestuff which separated out was filtered off, washed with alcohol and ether and boiled out twice with methyl alcohol, leaving 0.20 gram of purple crystals, melting at 231° C. and giving a rose coloured solution in alcohol.

The dyestuff is a sensitizer for photographic silver halide emulsions and increases the sensitivity of a silver iodobromide emulsion to about $\lambda$ 6400 Å. with a maximum at about $\lambda$ 5800 Å. and an indeterminate maximum at about $\lambda$ 4600 Å.

Example X 13.3 grams of 1-methylbenzoxazole and 18.6 grams of methyl-p-toluene sulphonate were fused together for 3 hours at 130–140° C. The mixture was then allowed to cool and 16.1 grams of N-ethylrhodanic acid, 120 ccs. of pyridine and 30 ccs. of acetic anhydride were added, when the mixture was gently boiled under a reflux condenser for 1½ hours. The mixture was then allowed to cool and poured into a beaker containing alcohol. The dyestuff separated out and was filtered off, washed with alcohol and ether and obtained as orange matted crystals, melting at 260° C. and giving an orange solution in alcohol—yield 10.8 grams.

The dyestuff is a sensitizer for silver halide photographic emulsions and increases the sensitivity of silver iodobromide emulsion to about $\lambda$ 6000 Å. with maxima at about $\lambda$ 5300 Å. and $\lambda$ 4700 Å.

Example XI 14.3 grams of quinaldine and 18.6 grams of methyl-p-toluene sulphonate were fused together for 3 hours at about 130–140° C. The mixture was then allowed to cool and 1.61 grams of N-ethyl-rhodanic acid, 120 ccs. of pyridine and 30 ccs. of acetic anhydride were then added, after which the mixture was gently boiled under a reflux condenser for 1½ hours. It was then poured into a beaker containing alcohol and the mixture was diluted with water. An oily substance separated out, which was separated from the water layer and dissolved in acetone, by heating. On allowing to cool dark green crystals were formed which were filtered off and washed with alcohol and ether—yield 4.6 grams—melting point 195° C. The crystals dissolved in alcohol to give a blue purple solution.

The dyestuff is a sensitizer for silver halide photographic emulsions and increases the sensitivity of a silver iodobromide emulsion to about $\lambda$ 6600 Å. with maxima at about $\lambda$ 4650 Å. and $\lambda$ 6000 Å.

Example XII 30.1 grams 2.3.3-trimethyl-indolenine methiodide, 16.1 grams N-ethyl rhodanic acid, 120 ccs. of pyridine and 30 ccs. of acetic anhydride were mixed together and gently boiled under a reflux condenser for about an hour and a half. The mixture was then allowed to cool and poured into a beaker of alcohol. The alcoholic mixture was diluted with water and an oily substance separated out. This substance was separated from the liquors and dissolved up in chloroform. Petroleum ether was then added slowly to this solution, and the dyestuff separated out as a brownish solid, melting at 220° C.—yield 1.4 grams.

Example XIII 14.9 grams 1-methyl-benzthiazole and 20.3 grams ethyl-p-toluene sulphonate were fused together for about four hours at 140–150° C. The mixture obtained was allowed to cool and 16.1 grams of N-ethyl rhodanic acid, 120 ccs. of pyridine and 30 ccs. of acetic anhydride were added, after which the mixture was boiled gently under a reflux condenser for about an hour and a half. The mixture was then allowed to cool and was poured into about 50 ccs. of alcohol. On being allowed to stand the dyestuff settled out and was filtered off and washed with water and ethyl alcohol and obtained as crystals melting at 215° C. and giving a rose coloured solution in alcohol—yield 7.6 grams.

The dyestuff is a powerful sensitizer for silver halide photographic emulsions and increases the sensitivity of silver iodobromide emulsions over a broad band to about λ 6000 Å. tailing off to about λ 6600 Å.

*Example XIV*

30.1 grams of 2:3:3-trimethylindolenine methiodide, 13.1 grams of N-methyl-2-thio-4-keto-tetrahydro oxazole, 100 ccs. of pyridine and 30 ccs. of acetic anhydride were mixed together and warmed on a water bath. The mixture was then boiled gently under a reflux condenser for about one and a half hours, allowed to cool a little and poured into a beaker of ethyl alcohol. After standing for some time the alcoholic mixture was diluted with water but not so far as to precipitate an oily mass. Crystallization was started by scratching the sides of the vessel and assisted by gradual further dilution with water. The solid which precipitated was separated from the liquors and washed and was then purified by boiling out with methyl alcohol leaving 3.8 grams of scarlet matted crystals melting at 170° C. and giving an orange yellow solution in alcohol. The recrystallised dye melted at 198° C.

The dyestuff is a sensitizer for photographic silver halide emulsions and extends the sensitivity of a silver iodobromide emulsion to about λ 6000 Å. with maxima at about λ 4600 Å. and λ 5500 Å.

*Example XV*

14.9 grams of 1-methylbenzthiazole were fused together with 18.7 grams of methyl-p-toluene sulphonate for about 2½ hours at 130–140° C. The mixture was then allowed to cool and 13.1 grams of N-methyl-2-thio-4-keto-tetrahydro oxazole, 120 ccs. of pyridine and 30 ccs. of acetic anhydride were added after which the mixture was gently warmed on a water bath for a few minutes and then boiled gently under a reflux condenser for about one and a half hours. The mixture was then allowed to cool slightly and was poured into about 75 ccs. of ethyl alcohol. The dyestuff separated out and was filtered off and washed and 2.4 grams of shiny maroon crystals were obtained. A small portion of the crystals recrystallised from methyl alcohol melted at 281° C. Dissolved in alcohol the crystals gave an orange solution.

The dyestuff is a sensitizer for photographic silver halide emulsions and extends the sensitivity of silver iodobromide emulsion to about λ 5900 Å. with maxima at about λ 5500 Å. and λ 4700 Å.

*Example XVI*

13.3 grams of 1-methylbenzoxazole, 18.7 grams of methyl-p-toluene sulphonate were fused together at 130–140° C. for 3 hours. The mixture was then allowed to cool a little, and 13.1 grams of N-methyl-2-thio-4-keto-tetrahydro oxazole, 120 ccs. of pyridine and 30 ccs. of acetic anhydride were added and the mixture was then gently warmed on a water bath for a few minutes and then gently boiled under a reflux condenser for about 1½ hours. The mixture was then poured into a beaker of ethyl alcohol and allowed to stand. The dyestuff separated out and was filtered off and washed with alcohol—yield 4.0 grams. On recrystallisation from 200 ccs. methyl alcohol orange crystals melting at 290° C. and giving a yellow solution in alcohol were obtained.

The dyestuff is a sensitizer for silver halide photographic emulsions and extends the sensitivity of a silver iodobromide halide emulsion to about λ 5600 Å. with a maximum at about λ 4800 Å.

14.9 grams of 1-methylbenzthiazole and 18.7 grams of methyl-p-toluene sulphonate were fused together at 130–140° C. for 3 hours. The mixture was then allowed to cool and 14.5 grams of N-ethyl-2-thio-4-keto-tetra-hydro oxazole and 120 ccs. of pyridine and 30 ccs. of acetic anhydride were added and the mixture was warmed for a few minutes and then gently boiled under a reflux condenser for about one hour. The mixture was then poured into a beaker of alcohol and diluted carefully with water, insufficient to produce precipitation. On allowing to stand the dyestuff crystallised out and was filtered off and washed with alcohol, 6.7 grams being obtained. A portion of the dyestuff was recrystallised from methyl alcohol as orange crimson small matted needles, melting at 238° C. and giving an orange solution in alcohol.

The dyestuff is a powerful sensitizer for silver halide photographic emulsions and extends the sensitivity of silver iodobromide emulsion to about λ 5800 Å with maxima at about λ 5500 Å and λ 4950 Å.

*Example XVIII*

4.2 grams of 1-methylbenzthiazole and 5.2 grams of methyl-p-toluene sulphonate were fused together at 130–140° C. for about two hours. The mixture was then allowed to cool and 4.9 grams of 1-phenyl-3-methyl-5-pyrazolone, 35 ccs. of pyridine and 8.5 ccs. of acetic anhydride were added and the mixture was gently boiled under a reflux condenser for about 1½ hours. The mixture was allowed to cool and was then diluted with water when a solid precipitated out. This solid was filtered off, washed with spirit and being colourless was discarded. On further dilution of the filtrate a further solid was deposited which was separated off, washed and boiled with 50 ccs. of methyl alcohol and filtered hot. The residue was boiled with a further 50 ccs. of methyl alcohol and some dyestuff crystallised out from the liquid, as brick red matted crystals melting at 259° C. The residue from the second boiling was again boiled with 90 ccs. of methyl alcohol and a further quantity of dye was obtained from the liquor.

The dyestuff is a sensitizer for silver halide photographic emulsions and extends the sensitivity of a silver iodobromide emulsion to about λ 5800 Å with a maximum at about λ 4800 Å.

*Example XIX*

4.0 grams of 2-methyl-β-naphthathiazole and 3.8 grams of methyl-p-toluene sulphonate were fused together for 5 hours at 150–160° C. The mixture was then allowed to cool and 3.2 grams of N-ethylrhodanic acid and 25 ccs. of pyridine and 6 ccs. of acetic anhydride were added. The mixture was then gently boiled under a reflux condenser for about one and a quarter hours and was then poured into a beaker of ethyl alcohol. The mixture was then allowed to stand and the dyestuff which separated out was filtered off and washed with spirit and ether and boiled out with methyl alcohol, yielding 0.91 gram of small mauve crystals, melting at 291° C. and giving a rose magenta solution in alcohol.

The dyestuff is a sensitizer for photographic silver halide emulsions and extends the sensitivity of silver iodobromide emulsion to about λ 6400 A. with a strong maximum at λ 4800 A.

*Example XX*

3.92 grams of 1-methylbenzselenazole and 3.9 grams of methyl-p-toluene sulphonate were fused together for 4 hours at 130–140° C. The mixture was then allowed to cool and 3.2 grams of N-ethylrhodanic acid, 25 ccs. of pyridine and 6 ccs. of acetic anhydride were added after which the mixture was gently boiled under a reflux condenser for one and a quarter hours. The mixture was then poured into a beaker of ethyl alcohol and allowed to stand, when 0.5 grams of a dyestuff separated out. This dyestuff was filtered off, washed with spirit and ether and boiled out with 100 ccs. of methyl alcohol, leaving 0.41 gram of dark mauve matted crystals, melting at 239° C. and giving a rose coloured solution in alcohol.

The dyestuff is a strong sensitizer for photographic silver halide emulsions and increases the sensitivity of a silver iodobromide emulsion to about λ 6600 A. with maxima at about λ 5900 A. and λ4700 A.

*Example XXI*

3.0 grams of 1-methylbenzthiazole, 4.0 grams of methyl-p-toluene sulphonate were fused together for 4 hours at 130–140° C. The mixture was allowed to cool and 4.18 grams of N-phenylrhodanic acid, 25 ccs. of pyridine and 6 ccs. of acetic anhydride were added. The mixture was then boiled under a reflux condenser for 1½ hours, after which it was poured into a beaker of ethyl alcohol and allowed to stand. The 1.18 grams of a dyestuff which separated out was filtered off, washed with spirit and ether and boiled out with 100 ccs. of methyl alcohol, leaving 0.96 gram of purple crystals, melting at 294° C. and giving a rose coloured solution in alcohol.

The dyestuff is a powerful sensitizer for silver halide photographic emulsions and extends the sensitivity of a silver iodo bromide emulsion to about λ 6400 A. with maxima at about λ 5800 A. and λ 4900 A.

*Example XXII*

4.5 grams of 1-methylbenzthiazole and 6.0 grams of ethyl-p-toluene sulphonate were fused together for 4 hours at 140–150° C. The mixture was then allowed to cool and 4.35 grams of N-ethyl-2-thio-4-keto-tetrahydro oxazole, 36 ccs. of pyridine and 9 ccs. of acetic anhydride were added, after which the mixture was gently boiled for 1½ hours under a reflux condenser, and was then poured into a beaker of ethyl alcohol. The mixture was then allowed to stand. The dyestuff which separated out was filtered off, washed with spirit and ether. 0.67 gram of orange matted crystals, melting at 204° C. and giving an orange solution in alcohol were obtained.

The dyestuff is a powerful sensitizer for silver halide photographic emulsions and increases the sensitivity of a silver iodobromide emulsion to about λ 6300 A. with a strong maximum at about λ 5600 A.

*Example XXIII*

2.98 grams of 1-methylbenzthiazole, 3.8 grams of methyl-p-toluene sulphonate were fused together for 3 hours at 130–140° C. The mixture was allowed to cool and 2.94 grams of N-methylrhodanic acid, 30 ccs. of pyridine and 10 ccs. of propionic anhydride were added, and the mixture boiled under a reflux condenser for 1½ hours, after which it was poured into a beaker of alcohol. On cooling and standing a dyestuff crystallised out, which was filtered off and washed with alcohol. The residue was then boiled out with 50 ccs. of ethyl alcohol, leaving 0.12 gram of small dark purple crystals, melting at 294° C. and giving a rose coloured solution in alcohol.

The dyestuff is a powerful sensitizer for silver halide photographic emulsions and extends the sensitivity of a silver iodobromide emulsion to about λ 6200 A. with maxima at about λ 5800 A. and λ 4700 A.

*Example XXIV*

2.98 grams of 1-methylbenzthiazole, 3.8 grams of methyl-p-toluene sulphonate were fused for 3 hours at 130–140° C. The mixture was then allowed to cool and 2.94 grams of N-methyl rhodanic acid, 25 ccs. of pyridine and 15 grams of benzoic anhydride were added. The mixture was then boiled under a reflux condenser for one hour and afterwards poured into a beaker of ethyl alcohol. The dyestuff which separated out was filtered off, washed with spirit and ether and was boiled out with 30 ccs. of methyl alcohol, leaving 0.6 gram of light blue crystals melting at 274° C. with decomposition. A further quantity of dye was obtained by diluting the alcoholic mixture in a beaker with water.

*Example XXV*

2.66 grams of 1-methylbenzoxazole and 3.8 grams of methyl-p-toluene sulphonate were fused together for 3 hours at 130–140° C. The mixture was cooled and 2.94 grams of N-methylrhodanic acid, 25 ccs. of pyridine and 8 ccs. of propionic anhydride were added. The mixture was then boiled gently in a reflux condenser for one hour, after which it was poured into a beaker containing ethyl alcohol and allowed to stand. The dyestuff which separated out was filtered off, washed with spirit and ether leaving 0.62 gram of maroon crystals melting at 247° C.

*Example XXVI*

2.86 grams of quinaldine, 3.8 grams of methyl-p-toluene sulphonate were fused together for 3 hours at 130–140° C. 2.94 grams of N-methyl rhodanic acid, 25 ccs. of pyridine and 8 ccs. of propionic anhydride were added and the mixture was gently boiled under a reflux condenser for one hour. The mixture was then poured into a beaker of ethyl alcohol and allowed to cool. The dyestuff which separated out was filtered off, washed with alcohol and ether leaving 0.15 gram of small green crystals, melting at 275° C.

*Example XXVII*

3.50 grams of 2-methyl-4-phenylthiazole and 3.9 grams of methyl-p-toluene sulphonate were fused together for 3 hours at 130° C. The mixture was cooled and 2.94 grams of N-methylrhodanic acid, 25 ccs. of pyridine and 6 ccs. of acetic anhydride were added and the mixture was gently boiled under reflux condenser for one and a quarter hours. The mixture was then poured into a beaker of alcohol and cooled in a freezing mixture. The dyestuff which separated out was filtered off, washed with alcohol and ether, leaving 0.51 gram of dark blue crystals, melting at 232° C. A further precipitate was obtained on diluting the mother liquors.

*Example XXVIII*

1.58 grams of 2.4-dimethylquinazoline and 1.8 grams of methyl-p-toluene sulphonate were fused together for 4 hours at 130° C. The mixture was then allowed to cool and 1.47 grams of N-methylrhodanic acid, 15 ccs. of pyridine and 5 ccs. of acetic anhydride were added. The mixture was then boiled for one and a quarter hours under a reflux condenser after which it was poured into a beaker of alcohol and cooled in a freezing mixture. The precipitate formed was filtered off, washed with alcohol and ether, leaving 0.29 gram of solid, melting at 178° C. This solid was boiled out with 100 ccs. of methyl alcohol leaving .012 gram of small dark brown crystals melting at 212° C. A further quantity of the dye was obtained by diluting the mother liquors.

*Example XXIX*

2.26 grams of 2.4-dimethylthiazole and 3.9 grams of methyl-p-toluene sulphonate were fused together for 3 hours at 130° C. 2.94 grams of N-methylrhodanic acid, and 25 ccs. of pyridine and 6 ccs. of acetic anhydride were then added and the mixture was gently boiled under a reflux condenser for 1½ hours. The mixture was then poured into a beaker of spirit, and allowed to stand. The dyestuff which separated out was filtered off, and washed with alcohol and ether, leaving 0.81 gram of dark green crystals melting at 225° C. with decomposition.

*Example XXX*

1.86 grams of α-picoline and 3.8 grams of methyl-p-toluene sulphonate were fused together for one hour at 130–140° C. The mixture was allowed to cool and 2.94 grams of N-ethylrhodanic acid, 25 ccs. of pyridine and 6 ccs. of acetic anhydride were added. The mixture was then boiled gently under a reflux condenser for one and a quarter hours after which it was poured into a beaker of alcohol and cooled in a freezing mixture. The solid which separated out was filtered off, washed with alcohol and ether, leaving .051 gram of the substance melting at 95° C. This was boiled out with 50 ccs. of methyl alcohol and green crystals were obtained from the alcohol on crystallisation, melting at 235° C. with decomposition.

*Example XXXI*

1.59 grams of 2-methyl-4-phenyl-oxazole and 1.9 grams of methyl-p-toluene sulphonate were fused together for 3 hours at 130–140° C. The mixture was allowed to cool and 1.47 grams of N-methylrhodanic acid, 8 ccs. of pyridine and 6 ccs. of acetic anhydride were added and the mixture was gently boiled under a reflux condenser for 1½ hours. The mixture was then poured into a beaker of alcohol and allowed to cool and the precipitate which settled out was filtered off, washed with alcohol and ether, leaving 0.10 gram of dark blue crystals melting at 203° C.

I claim:

1. A process for the production of dyestuffs comprising condensing a 5-membered ring compound containing the system:

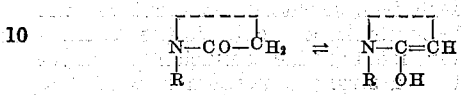

in which R is selected from the class consisting of hydrogen, alkyl, aryl and aralkyl groups in the presence of an anhydride of a monobasic organic carboxylic acid and an acid binding agent with a compound selected from the class consisting of quaternary salts of heterocyclic nitrogen compounds having a reactive methyl group in the α position to the nitrogen atom and quaternary salts of heterocyclic nitrogen compounds having a reactive methyl group in the γ position to the nitrogen atom.

2. The process of claim 1 wherein pyridine is employed as the acid binding agent.

3. The process of claim 1 wherein the anhydride of a monobasic organic acid is selected from the class consisting of acetic anhydride, propionic anhydride and benzoic anhydride.

4. A process for the production of dyestuffs comprising condensing an N-alkyl rhodanic acid in the presence of acetic anhydride and pyridine with a compound selected from the class consisting of quaternary salts of heterocyclic nitrogen compounds having a reactive methyl group in the α position to the nitrogen atom and quaternary salts of heterocyclic nitrogen compounds having a reactive methyl group in the γ position to the nitrogen atom.

5. A process for the production of dyestuffs comprising condensing a compound selected from the group consisting of N-aryl rhodanic acids and N-aralkyl rhodanic acids in the presence of acetic anhydride and pyridine with a compound selected from the class consisting of quaternary salts of heterocyclic nitrogen compounds having a reactive methyl group in the α position to the nitrogen atom and quaternary salts of heterocyclic nitrogen compounds having a reactive methyl group in the γ position to the nitrogen atom.

6. A process for the production of dyestuffs comprising condensing N-alkyl-2-thio-4-keto-tetrahydrooxazole in the presence of acetic anhydride and pyridine with a compound selected from the class consisting of quaternary salts of heterocyclic nitrogen compounds having a reactive methyl group in the α position to the nitrogen atom and quaternary salts of heterocyclic nitrogen compounds having a reactive methyl group in the γ position to the nitrogen atom.

7. A process for the production of a dyestuff comprising condensing N-ethyl rhodanic acid in the presence of acetic anhydride and pyridine with 1-methylbenzoxazole methyl-p-toluene sulphonate.

8. A process for the production of a dyestuff comprising condensing N-methyl-2-thio-4-keto-tetrahydrooxazole in the presence of acetic anhydride and pyridine with 2:3:3-trimethylindolenine methiodide.

9. A dyestuff having the general formula:

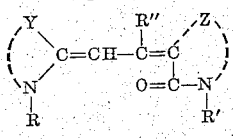

wherein Y constitutes the non-metallic atoms necessary to complete an oxazole nucleus, Z represents the non-metallic atoms necessary to complete a five-membered heterocyclic nucleus, R is a hydrocarbon radical, R' is a member of the group consisting of hydrogen, alkyl, aryl and aralkyl groups, R'' is a hydrocarbon radical selected from the group consisting of alkyl and aryl radicals.

10. A dyestuff having the general formula:

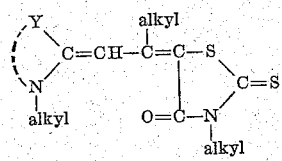

wherein Y constitutes the non-metallic atoms necessary to complete an oxazole nucleus, and alkyl contains from 1 to 2 carbon atoms.

11. A dyestuff having the formula:

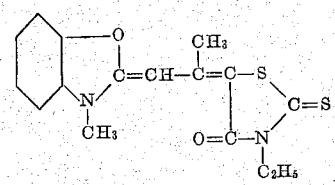

which dyestuff gives an orange alcoholic solution yielding orange matted crystals melting at 260° C.

12. A dyestuff having the general formula:

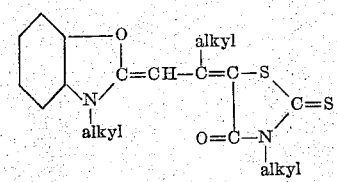

wherein alkyl contains from 1 to 2 carbon atoms.

JOHN DAVID KENDALL.